United States Patent [19]
Gion et al.

[11] Patent Number: 5,548,665
[45] Date of Patent: Aug. 20, 1996

[54] VECTOR CORRELATION DETECTING CIRCUIT

[75] Inventors: Masahiro Gion, Kyoto; Masaki Toyokura, Osaka, both of Japan

[73] Assignee: Matsushita Electric Industrial Co., Ltd., Osaka, Japan

[21] Appl. No.: 124,658

[22] Filed: Sep. 9, 1993

[30] Foreign Application Priority Data

Sep. 9, 1992 [JP] Japan .................................. 4-240531

[51] Int. Cl.$^6$ .................................................. G06F 17/15
[52] U.S. Cl. .................................... 382/276; 364/728.03
[58] Field of Search ............................. 382/41, 42, 276, 382/278; 348/402, 407; 364/715.09, 728.03, 725

[56] References Cited

U.S. PATENT DOCUMENTS

| | | | |
|---|---|---|---|
| 4,924,422 | 5/1990 | Vassiliadis et al. | 364/715.09 |
| 5,046,179 | 9/1991 | Uomori et al. | 382/42 |
| 5,329,318 | 7/1994 | Keith | 348/402 |

FOREIGN PATENT DOCUMENTS 3-113571  5/1991  Japan .

Primary Examiner—Leo Boudreau
Assistant Examiner—Chris Kelley
Attorney, Agent, or Firm—McDermott, Will & Emery

[57] ABSTRACT

A subtracter performs a subtraction (Xi–Yi) per corresponding components of two pairs of N-dimensional vector data (X1, X2, ... XN), (Y1, Y2, ... , YN). An exclusive disjunction circuit selects (Xi–Yi) when a result of subtraction is positive, and inverts bits of the result of subtraction to select the bit-inverted data ^(Xi–Yi) when the result of subtraction is negative. The selection is carried out using a most significant bit of the result of subtraction as a control signal. An accumulator accumulates the selected data and a value of the most significant bit of the result of subtraction. Accordingly only one subtracter suffice. Since the operation of adding 1 to the inverted data of the result of subtraction when the result of subtraction is negative is carried out concurrently with the accumulation of the result of subtraction by the accumulator, a vector correlation detecting circuit with less element and reduced operation time is contemplated.

2 Claims, 13 Drawing Sheets

| (27) | (26) | (28) |
|---|---|---|
| 0 | 00110101 | 00110101 |
| 1 | 00110101 | 11001010 |

| (17) | (13) | (14) | (18) |
|------|----------|----------|----------|
| 0 | 00110101 | 11001010 | 00110101 |
| 1 | 00110101 | 11001010 | 11001010 |

VECTOR CORRELATION DETECTING CIRCUIT

BACKGROUND OF THE INVENTION

This invention relates to an improvement in a vector correlation detecting circuit for a movement detection at a compression of moving image, and more particularly relates to a circuit for detecting which region of an image in a previous frame a given region of an observed image in a present frame is the most similar to.

Explained first is about a memory processing of a moving image data.

FIG. 6 shows an example of a moving image data. One screen, i.e. one frame is composed of 720×480 picture elements. The image moves by displaying 30 frames per second. One picture element is composed of 8 bits and indicates the luminance thereof. The image data has such a construction, so that, for example, a memory capacity of 10×60×30×720×480×8=49,766,400,000 bits is required for recording 10-minute image data.

As a result, such a voluminous image data requires much time for transferring, storing and editing the data, and involves excessive cost in a hardware. In order to attack the problem, the image data is compressed to reduce the time and cost.

FIGS. 7, 8(a), 8(b) and 9 show an example of the image data compression. The compression method in the figures uses correlation between frames. As shown in FIG. 7, utilizing that an image of a one-frame previous frame is similar to a present frame, a finite difference of the image data between the one-frame previous frame and the present frame is extract to reduce data.

In order to further compress the data, an image region which is most similar to an observed image region is searched, namely the movement detection is carried out. The movement detection is ordinarily carried out per macro block. The macro block means, as shown in FIG. 8(a), a micro section into which the frame is divided, and is ordinarily composed of 16×16 picture elements. Wherein, the movement detection is carried out, as shown in FIG. 8(b), in such a manner that at the calculation of finite difference between a given macro block of the present frame and that of the previous frame, a block whose finite difference is smaller is searched around the macro block to obtain a further smaller finite difference data. A search region around the macro block is ordinarily composed of about 48×48 picture elements.

The above movement detection is carried out, for example, considering that an image region is a vector having components whose number is the number of picture elements, and a correlation between the image regions is a correlation of two vectors. The correlation of the two vectors is measured per micro block, using a scale S expressed by a formula (1), and an image region the scale S of which is the smallest is judged as the most similar region.

$$S = \sum_{i=1}^{256} |Xi - Yi| \tag{1}$$

X: data within macro block of frame to be compressed
Y: data within macro block of previous frame
Xi: i-th component of data X
Yi: i-th component of data Y By such a movement detection, the finite difference data is made further smaller, as shown in FIG. 9.

The above calculation is repeated 32×32=1024 times within the search region. For every macro block this operation is repeated 45×30=1350 times, thus the processing per one frame is completed. 10×60×30×1350=24,300,000 times calculations are required for 10-minute image data processing.

In this way, the movement detection requires the repetition of the large amount of calculations, which consumes much time. Therefore, speed-up of a basic operation of the calculator is desired in order to reduce the calculation time.

A parallel operation of the calculators is considered for improving the calculation processing. In so doing, however, a considerable number of calculators must be arranged, so that the hardware increases in its area as a whole. The size reduction of hardware of the basic calculator is desired since the size reduction thereof is effective for an image processing system as a whole though the reduced area is slight.

FIG. 10 schematically shows a predictor utilizing the movement detection. In the figure, reference numeral 51 indicates a present frame. 52 is an observed image region in the present frame 51. 53 is a previous frame. 54 is a search region in the previous frame 53. 55 is an image region which is the most similar to the observed region 54 in the search region 54. As described before, for the prediction using the movement detection, the most similar region is searched first in the previous frame 53 with respect to the observed image region 52. Normally the search is conducted in the image region 54 around the part corresponding to the observed image region 52. Next, after the most similar region 55 is determined, the finite difference between the search region 54 and the observed image region 52 is calculated by a finite difference calculator 56, then the finite difference data is coded by an encoder 57 with orthogonal transform or the like.

Conventionally, for calculating the scale S with the formula (1), absolute values of Xi and Yi are calculated per components X, Y. The conventional methods are shown in FIGS. 11 and 12.

A conventional vector correlation detecting circuit 1 in FIG. 11 is explained first. In the figure, reference numerals 61 and 62 designate corresponding component data Xi, Yi of two sets of N-dimensional vector data (X1, X2, ..., XN), (Y1, Y2, ..., YN). 63 and 64 are subtracters. 65 is a multiplexer. 66 is an accumulator. In the method in FIG. 11, the subtracters 63, 64 perform respective subtractions (Xi–Yi) and (Yi–Xi) for the corresponding component data Xi 61, Yi 62 of the two sets of N-dimensional vector data (X1, X2, ..., XN), (Y1, Y2, ..., YN). The multiplexer 65 selects one, which is positive, of two results of subtractions to obtain a value of |Xi–Yi|. The accumulator 66 accumulates the value thereof as "i" is increased.

Next, the conventional vector correlation detecting circuit 2 in FIG. 12 is explained. In the figure, reference numerals 71 and 72 designate, as well as the above, corresponding component data Xi, Yi of two sets of N-dimensional vector data (X1, X2, ..., XN), (Y1, Y2, ..., YN). 73 is a subtracter. 74 is a bit inversion circuit. 75 is an adder. 76 is a multiplexer. 77 is an accumulator. In the correlation detecting circuit in FIG. 12, the subtracter 73 performs a subtraction (Xi–Yi) for input data Xi 71, Yi 72 of the two sets of N-dimensional vector data (X1, X2, ..., XN), (1, Y2, ..., YN). The result of subtraction (Xi–Yi) is directly outputted when the result of subtraction is positive, and a calculation processing for 2's complement notation expressed by a formula (2) is carried out when the result of subtraction is negative.

$$|Xi - Yi| = \tilde{}(Xi - Yi) + 1 \tag{2}$$

Namely, after bits of Xi–Yi are inverted by the bit inversion circuit 74, 1 is added by the adder 75 to output data of ^(Xi–Yi)+1. Wherein, "^" means a bit inversion. Obtaining a value of |Xi–Yi|, the value is accumulated by the accumulator 77 as "i" is increased.

FIG. 13 shows another conventional vector correlation detecting circuit 3. In the figure, reference numerals 81 and 82 indicate two sets of N-dimensional vector data (X1, X2, ..., XN), (Y1, Y2, ..., YN). 83 is subtracter. 84 is a bit inversion circuit for inverting bits of a result of subtraction which is obtained by the subtracter 83. 85 is a multiplexer for selecting the result of subtraction or the result of subtraction through the bit inversion circuit 84. 86 is a counter for counting the number of result of subtraction, whose value is negative, obtained by the subtracter 83. 87 is an accumulator. 88 is an adder.

In the vector correlation detecting circuit 3, the subtracter 83 performs a subtraction (Xi–Yi) per each corresponding components of the two N-dimensional vector data 81 (X1, X2, ..., XN), 82 (Y1, Y2, ..., YN). The multiplexer 85 selects the data (Xi–Yi) directly when the result of subtraction is positive, and selects a bit-inverted data ^(Xi–Yi) when the result of subtraction is negative so as to obtain data whose number is N. The counter 86 counts the number of cases where the result of subtraction is negative. The adder 88 adds the N data and the value of the counter 86 to obtain a correlation value of the vector.

The principal of the calculation is:

|Xi–Yi|=^(Xi–Yi)+1 when the value of (Xi–Yi) is negative at the calculation of |Xi–Yi|. Wherein, the counter 86 counts the number of "+1" of the last item at the right side, then the counted result is added to a whole added result.

However, the vector correlation detecting circuit 1 in FIG. 11 needs the two subtracters for obtaining one absolute value, which requires a large number of elements. In the vector correlation detecting circuit in FIG. 12, there cause carries from a least significant bit to a most significant bit at a stage of adding 1. This requires much time for each calculation of absolute value. Moreover, the conventional example shown in FIG. 13 requires the counter and the adder, which increases the elements in number and calculation time by processing time for adding the value of the counter to the adder.

SUMMARY OF THE INVENTION

Speed-up of the above operation in the vector correlation detecting circuit is desired. The present invention has its object of providing a vector correlation detecting circuit with less elements and less calculation time.

To attain the above object, in the present invention, the operation of adding 1 to an inverted data of the result of subtraction when the result of subtracter is negative is carried out at the same time as the accumulation of the result of subtraction by the accumulator. Accordingly, the counter and the adder are made unnecessary, so that the elements are reduced in number, speeding up the calculation.

In detail, a vector correlation detecting circuit for calculating a vector correlation value in the present invention, comprises: a subtracter, to which two inputs are inputted, for performing a subtraction (Xi–Yi) per corresponding components of two sets of N-dimensional vector data (X1, X2, ..., XN), (Y1, Y2, ..., YN); an exclusive disjunction circuit for obtaining data whose number is N by selecting a result of subtraction by said subtracter when the result of subtraction is positive and by inverting bits of the result of subtraction by said subtracter and selecting an inverted data ^(Xi–Yi) thereof when the result of subtraction is negative; and an accumulator for obtaining a total sum of a value of a most significant bit of each result of subtraction by said subtracter and values of the N data obtained by said exclusive disjunction circuit.

Accordingly, the present invention requires only one subtracter. Further, since the operation of adding 1 to the inverted data of the result of subtraction when the result of subtracter is negative is carried out at the same time as the accumulation of the result of subtraction by the accumulator, the vector correlation detecting circuit with less elements and less calculation time is contemplated.

In addition, when the exclusive disjunction circuit has functions of inverting a bit of the result of subtraction and of selecting the result of subtraction or a bit inverted data thereof according to whether the result of subtraction is positive or negative, the vector correlation detecting circuit with further less elements is contemplated.

BRIEF DESCRIPTION OF THE DRAWINGS

Accompanying drawings show preferred embodiments of the present invention, in which.

DETAILED DESCRIPTION OF PREFERRED EMBODIMENTS

Description is made below about preferred embodiments of the present invention, with reference to accompanying drawings.

(FIRST EMBODIMENT)

Figure 1:
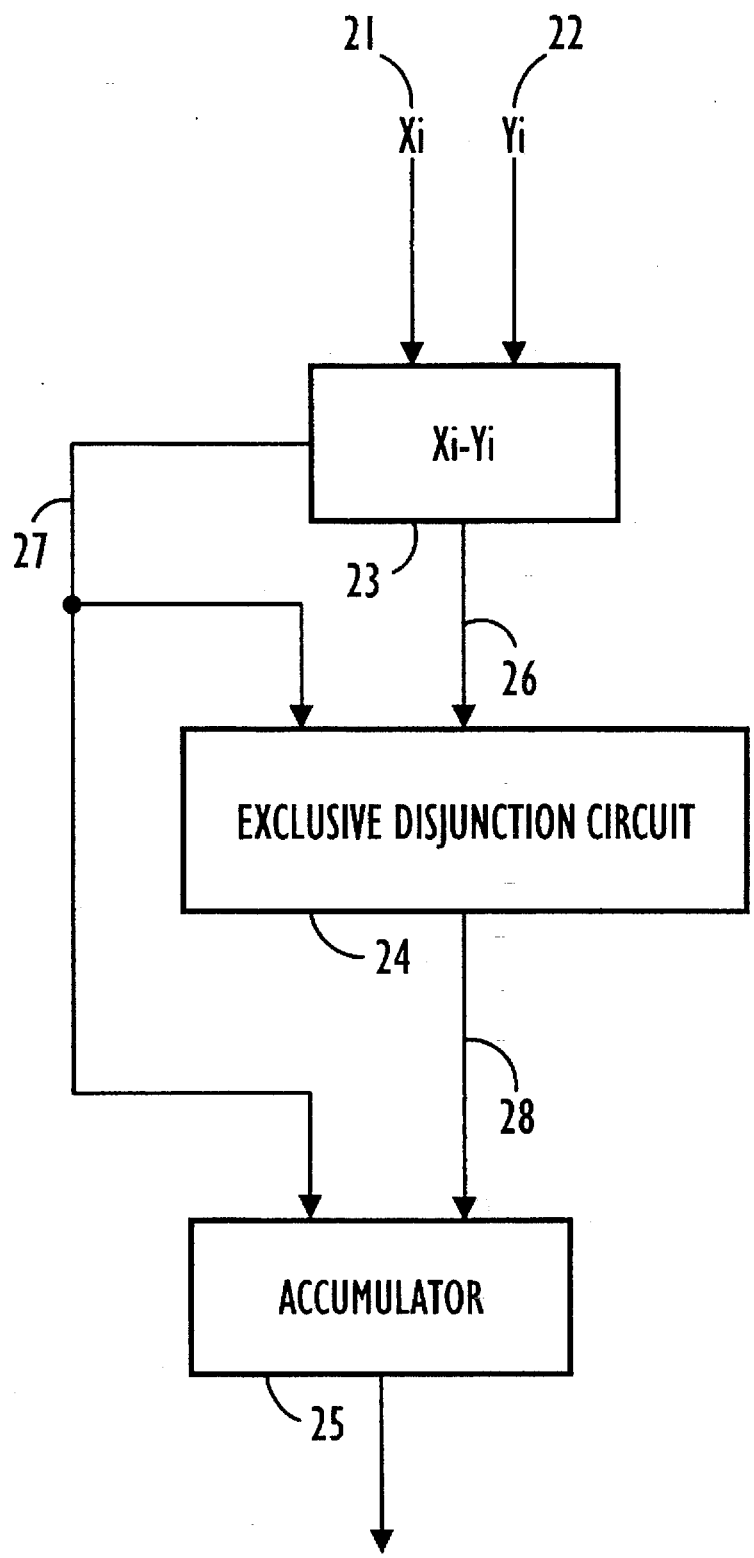
FIG. 1 is a block diagram showing a construction of a vector correlation detecting circuit according to a first embodiment in the present invention.

FIG. 1 shows a construction of a vector correlation detecting circuit in the first embodiment of the present invention. In the figure, reference numerals 21 and 22 are corresponding component data Xi, Yi of two pairs of N-dimensional vector data (X1, X2, ..., XN), (Y1, Y2, ..., YN). 23 is a subtracter, to which two inputs are inputted, for conducting a subtraction per corresponding components of the N-dimensional vector data. 26 is a result of the subtraction. 27 is a most significant bit of the result 26 of subtraction by the subtracter 23. 24 is an exclusive disjunction circuit, which receives as inputs the result 26 of subtraction and the most significant bit 27 thereof, for outputting the result 26 of subtraction directly when the most significant bit 27 thereof is 0 and for outputting the result of subtraction, inverting bits thereof, when the most significant bit is 1. 25 is an accumulator.

Discussed next is an operation of the vector correlation detecting circuit with the above construction. The subtracter 23 performs a subtraction (X1−Y1) for the first components X1, Y1 of the two sets of N-dimensional vector data. The result 26 of subtraction (X1−Y1) and the most significant bit 27 thereof are inputted to the exclusive disjunction circuit 24. The exclusive disjunction circuit 24 outputs the result 26 of subtraction directly when the most significant bit 27 thereof is 0, and outputs the result 27 of subtraction, inverting the bits thereof, when the most significant bit is 1. The accumulator whose initial value is 0 accumulates the outputted data and the value of the most significant bit 27 of the result 26 of subtraction.

Figures 2A, 2B:
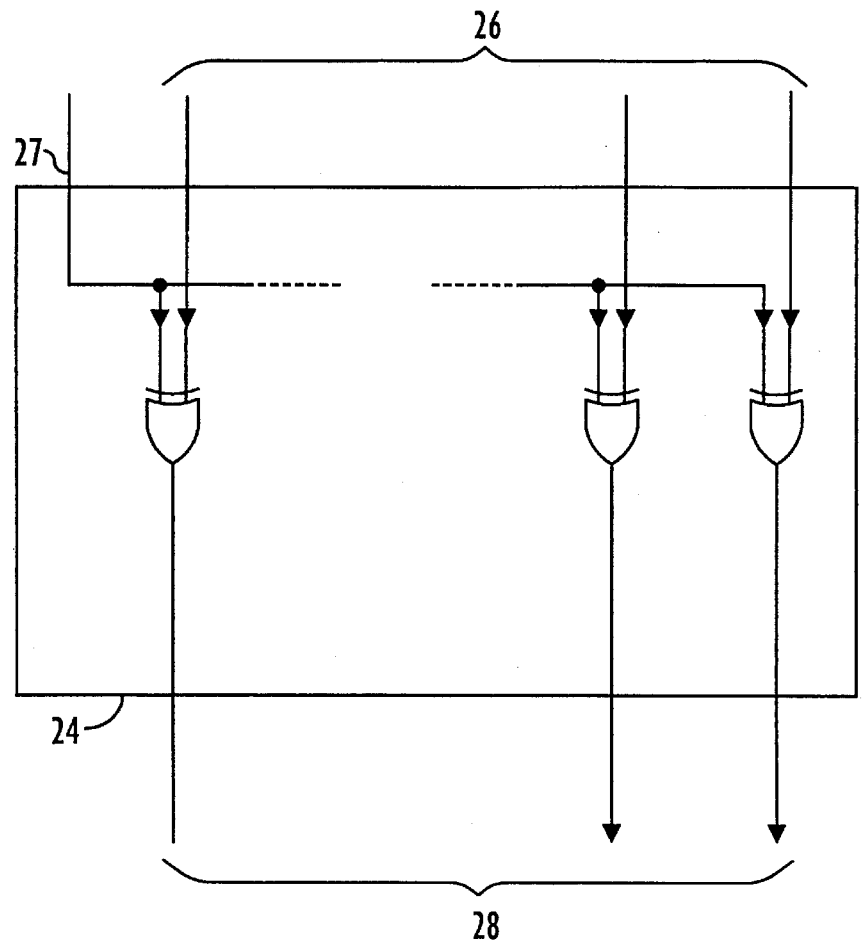
FIG. 2(a) is an explanatory drawing of an exclusive disjunction circuit of the vector correlation detecting circuit in the first embodiment.
FIG. 2(b) is a view explaining an operation of the exclusive disjunction circuit, using 8-bit picture element data in the first embodiment.

A processing of the exclusive disjunction circuit 24 is described in detail. As shown in FIG. 2(a), the exclusive disjunction circuit 24 calculates per bit an exclusive disjunction of the most significant bit 27 of the result 26 of subtraction and each bit of the result 26 of subtraction. Accordingly, as shown in FIG. 2(b), the most significant bit 27 of the result 26 of subtraction is 0 when the result 26 of subtraction is positive, so that the exclusive disjunction circuit 24 directly outputs each bit of the result 26 of subtraction. The most significant bit 27 of the result 26 of subtraction is 1 when the result 26 of subtraction is negative, so that the exclusive disjunction circuit 24 inverts and outputs each bit of the result 26 of subtraction.

Next, the same processing is carried out for the data of the second components X2, Y2. In detail, the subtracter 23 performs the subtraction (X2−Y2), the result 26 of subtraction (X2−Y2) and the most significant bit 27 of the result 26 of subtraction are inputted to the exclusive disjunction circuit 24. The exclusive disjunction circuit 24 outputs the result 26 of subtraction directly when the most significant bit 27 is 0, and inverts and outputs the bits of the result 26 of subtraction when the most significant bit 27 is 1. The accumulator 25 accumulates the outputted data and the value of the most significant bit 27 of the result 26 of subtraction. The same processing is continued to the N-th components XN, YN to obtain the scale S in the formula (1), sequentially incrementing the subscript.

Figure 3A:
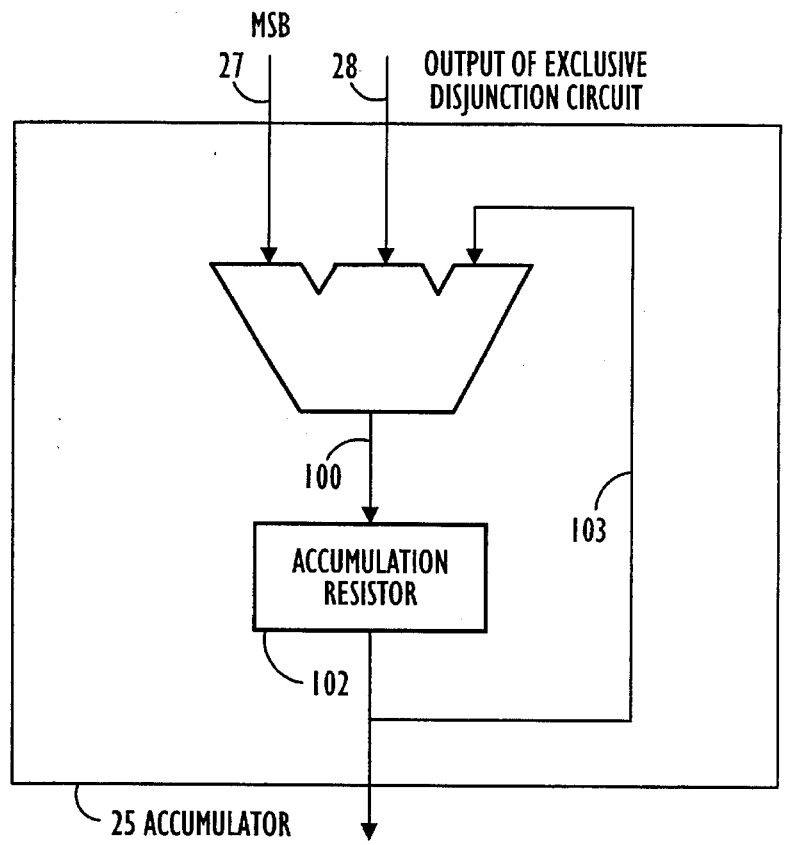
FIG. 3(a) is an explanatory drawing of an accumulator of the vector correlation detecting circuit in the first embodiment.
Figure 3B:
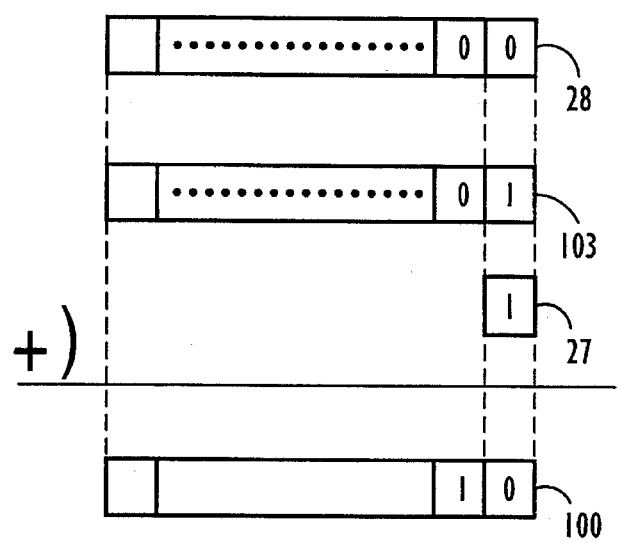
FIG. 3(b) is a view explaining an operation of the accumulator in the first embodiment.

The principal of the above calculation is described next. The most significant bit 27 of the result 26 of subtraction (Xi−Yi) is 0 when the result 26 is positive and 1 when the result 26 is negative. Accordingly, in the accumulator 25 composed of, as shown in FIG. 3(a), an adder 101 and an accumulation resistor 102 for storing an output 100 of the adder 101, when the accumulator 25 accumulates the value of the most significant bit 27 of the result 26 of subtraction and an output 28 of the exclusive disjunction circuit 24, the most significant bit 27 of the result 26 of subtraction is aligned to the most significant bit of the adder 101, as shown in FIG. 3(b). Then the adder 101 adds the three, the aligned most significant bit 27, the output 28 of the exclusive disjunction circuit 24 and the value of the accumulation resistor 103. Thus, the result 26 of subtraction (Xi−Yi) is directly accumulated when the result 26 of subtraction is positive, and the value expressed by the formula (2) is accumulated when the result 26 of subtraction is negative, which means that the value of the formula (2) is obtained accurately.

Figure 11:
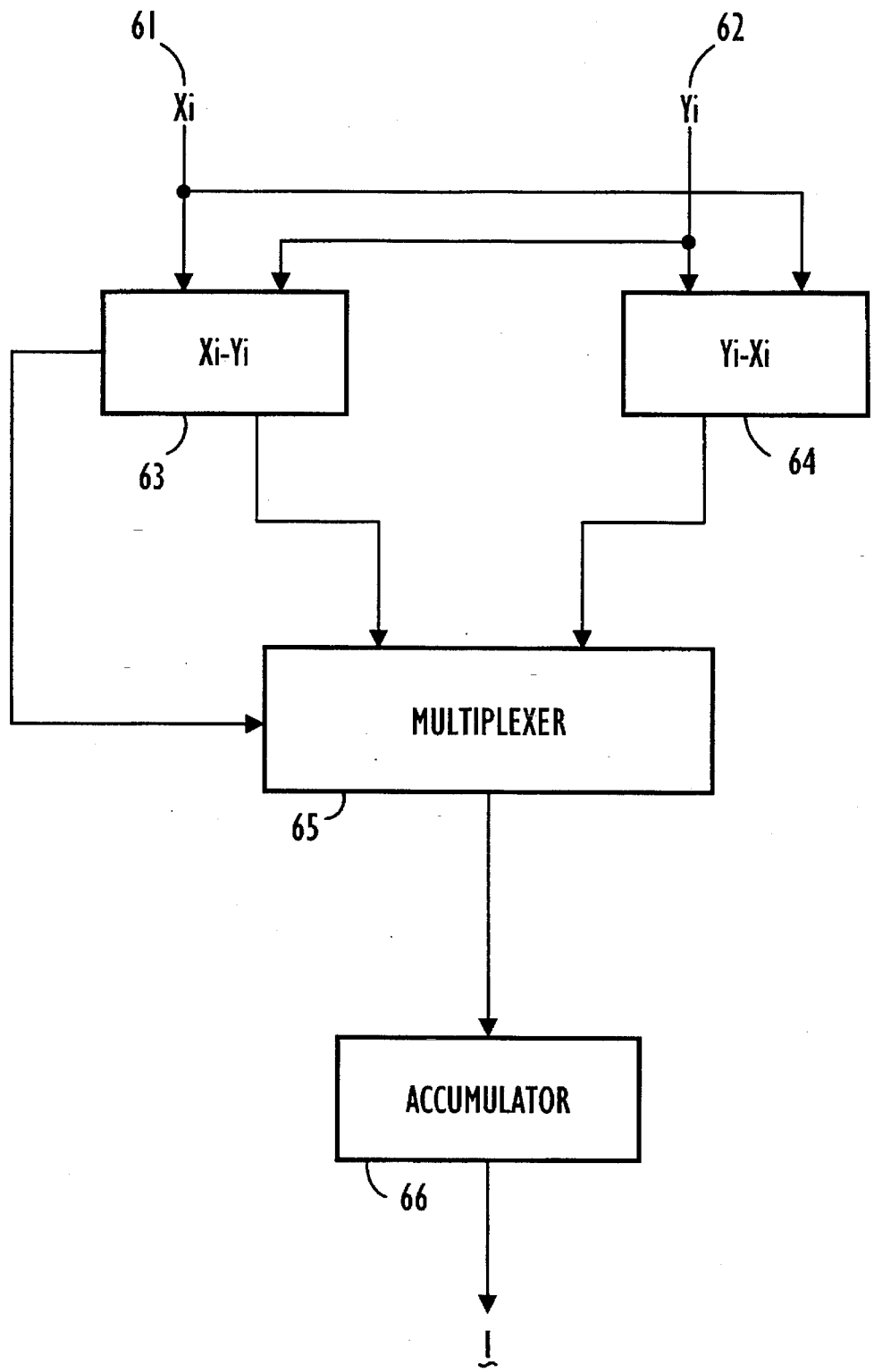
FIG. 11 is a block diagram showing a construction of a conventional vector correlation detecting circuit 1.
Figure 12:
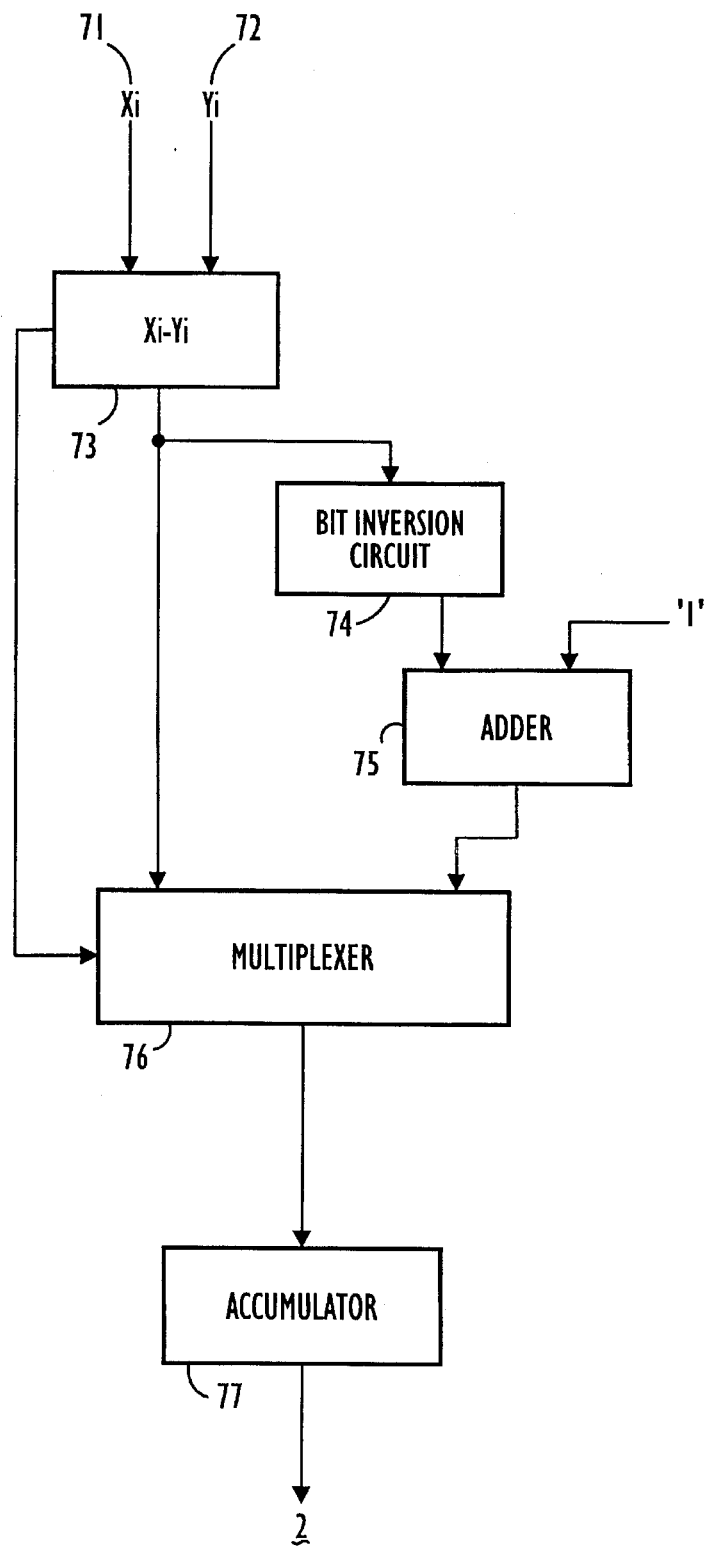
FIG. 12 is a block diagram showing a construction of another conventional vector correlation detecting circuit 2.
Figure 13:
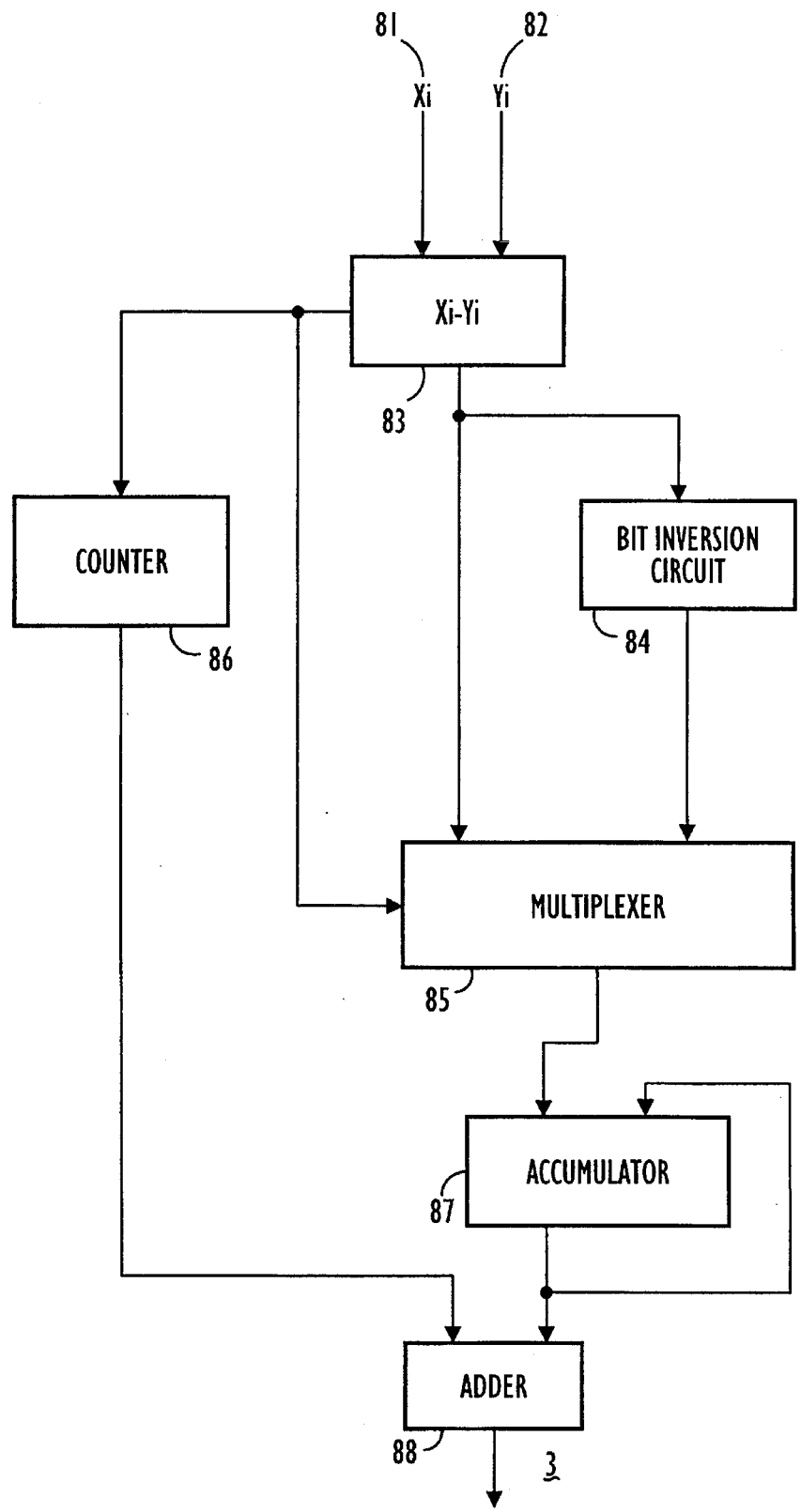
FIG. 13 is a block diagram showing a construction of another conventional vector correlation detecting circuit 3.

Consequently, in the first embodiment, only one subtraction 23 suffices, which leads to less elements, compared with the conventional vector correlation detecting circuit 1 shown in FIG. 11. No carry is caused at the stage of adding 1 as in the conventional vector correlation detecting circuit 2 shown in FIG. 12, so that operation time required for each subtraction and calculation of absolute value of the result thereof is reduced. In addition, since the operation of adding 1 to the inverted data of the result of subtraction when the result 26 of subtraction by subtracter 23 is negative is carried out concurrently with the accumulation of the result of subtraction by the accumulator 25, the counter and the adder are unnecessary, thus reducing the number of elements, compared with the conventional vector correlation detecting circuits 3 shown in FIG. 13.

Particularly, since the exclusive disjunction circuit 24 has functions of inverting a bit and selecting one between the result of subtraction or the bit inverted data thereof according to whether the result of subtraction is positive or negative, the number of elements are reduced, compared with a case where separate elements function only the respective functions.

(SECOND EMBODIMENT)

Figure 4:
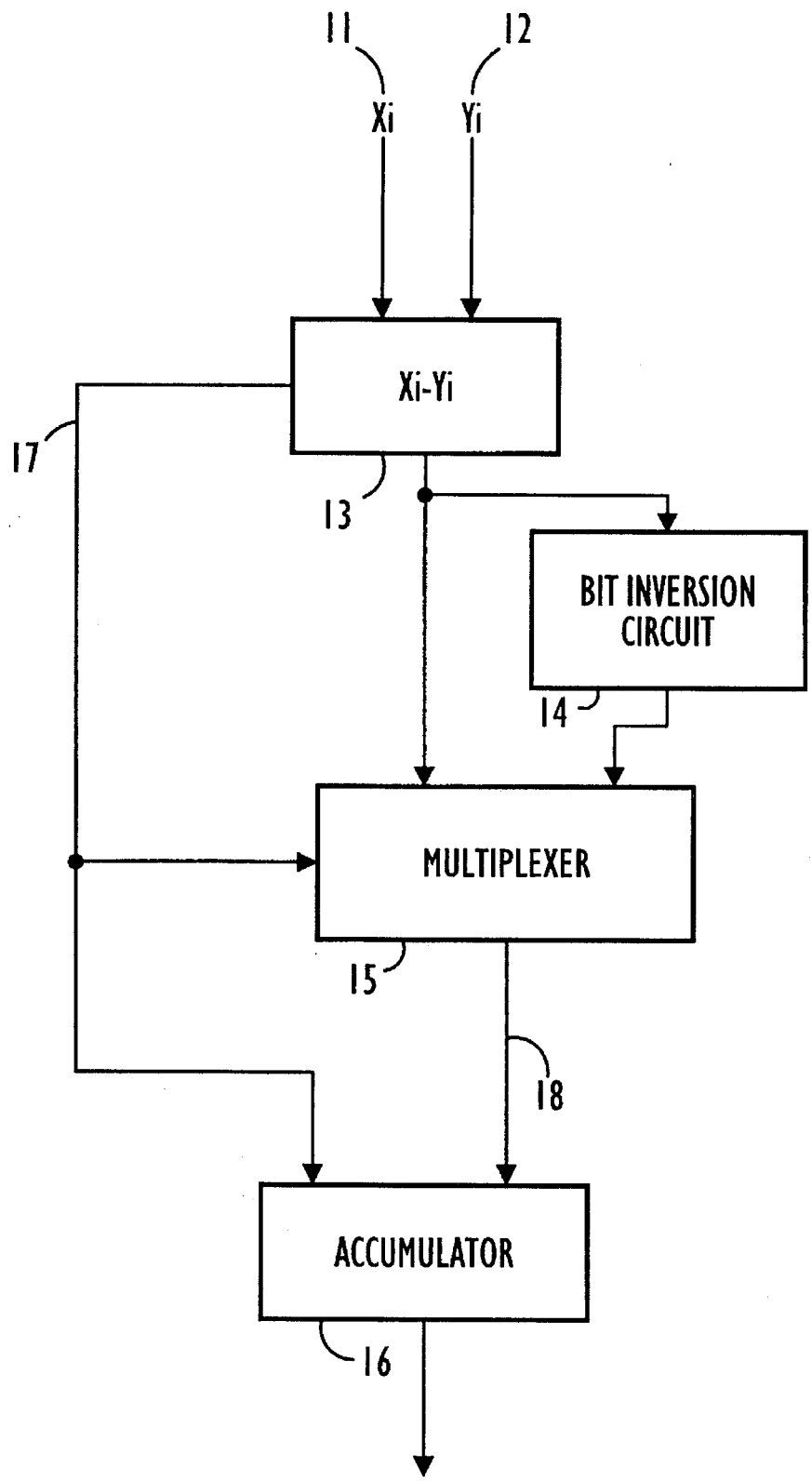
FIG. 4 is a block diagram showing a construction of a vector correlation detecting circuit according to a second embodiment of the present invention.

FIG. 4 shows a construction of a vector correlation detecting circuit according to the second embodiment. In the figure, reference numerals 11 and 12 indicate corresponding component data Xi, Yi of two sets of N-dimensional vector data (X1, X2, ..., XN), (Y1, Y2, ..., YN). 13 is a subtracter, to which two inputs are inputted, for performing a subtraction per corresponding components of the N-dimensional vector data. 14 is a bit inversion circuit for inverting a bit of each result of subtraction which is obtained by the subtracter 13. 15 is a multiplexer as selection means for obtaining data whose number is N by selecting the result of subtraction which is obtained by the subtracter 13 when the result of subtraction is positive and selecting the bit inverted data of the result of subtraction which is obtained by the bit inversion circuit 14 when the result of subtraction is negative. 16 is an accumulator. 17 is a most significant bit of the result of subtraction. 18 is an output data of the multiplexer 15.

Figures 5A, 5B:
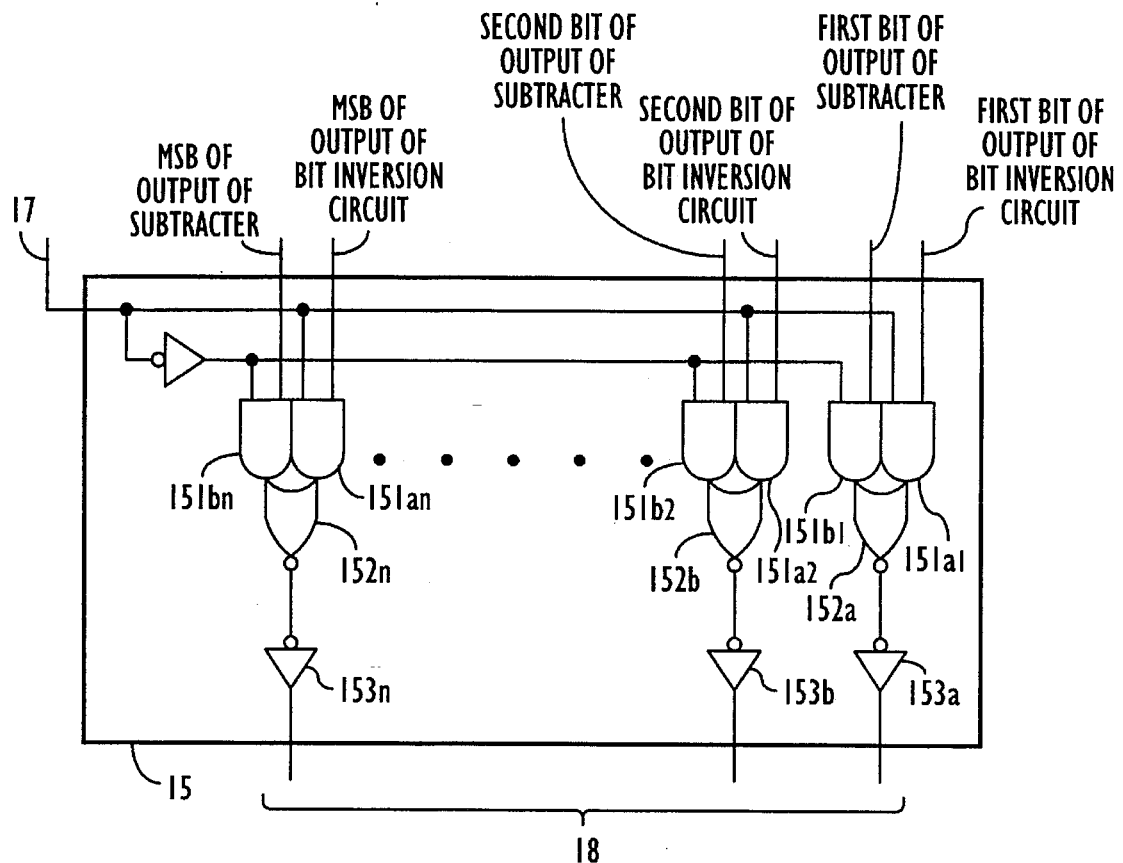
FIG. 5(a) is a view showing a detailed construction of a multiplexer in the second embodiment.
FIG. 5(b) is a view explaining an operation of the multiplexer, using 8-bit picture element data in the second embodiment.
Figure 6:
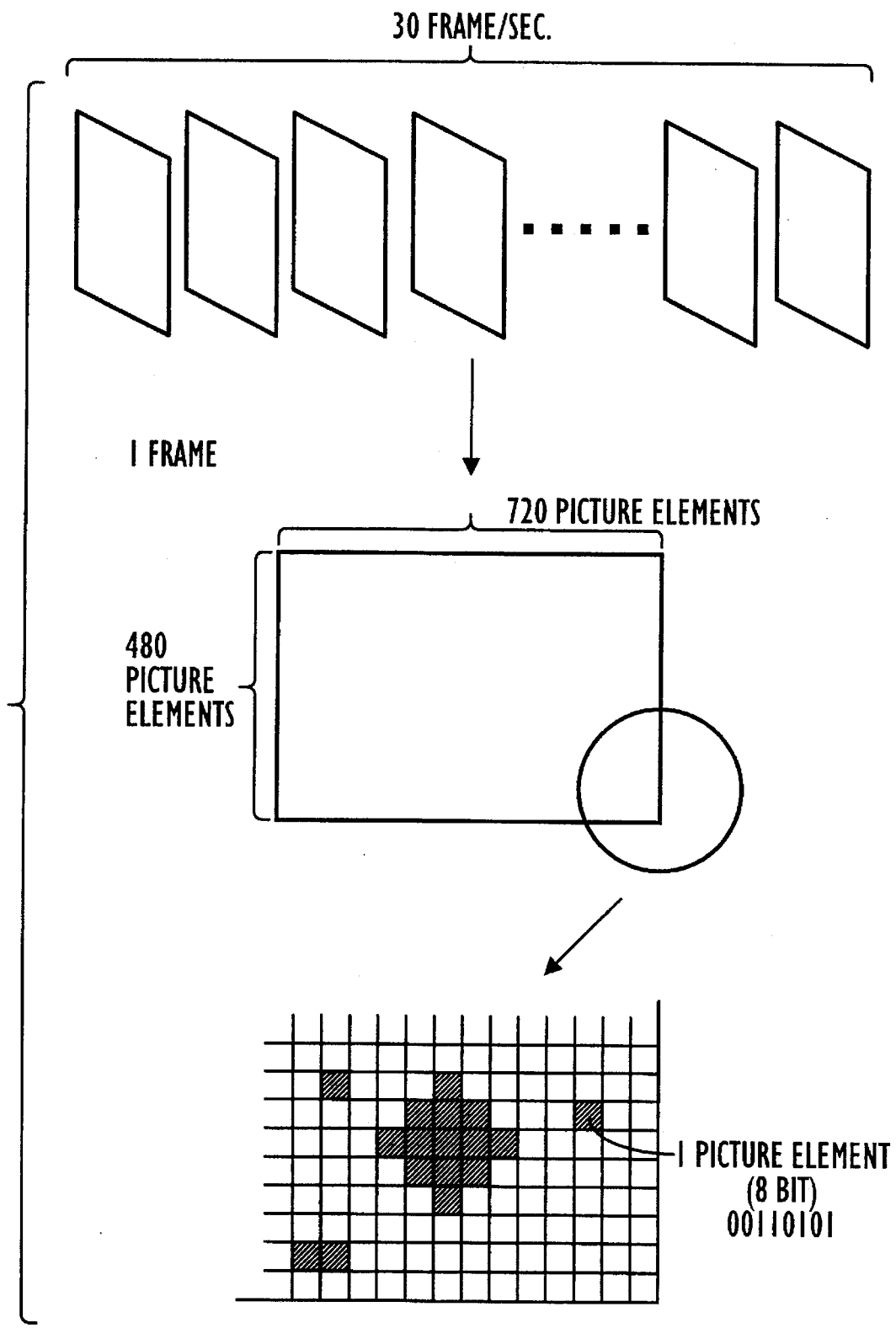
FIG. 6 is an explanatory drawing of a moving image data.
Figure 7:
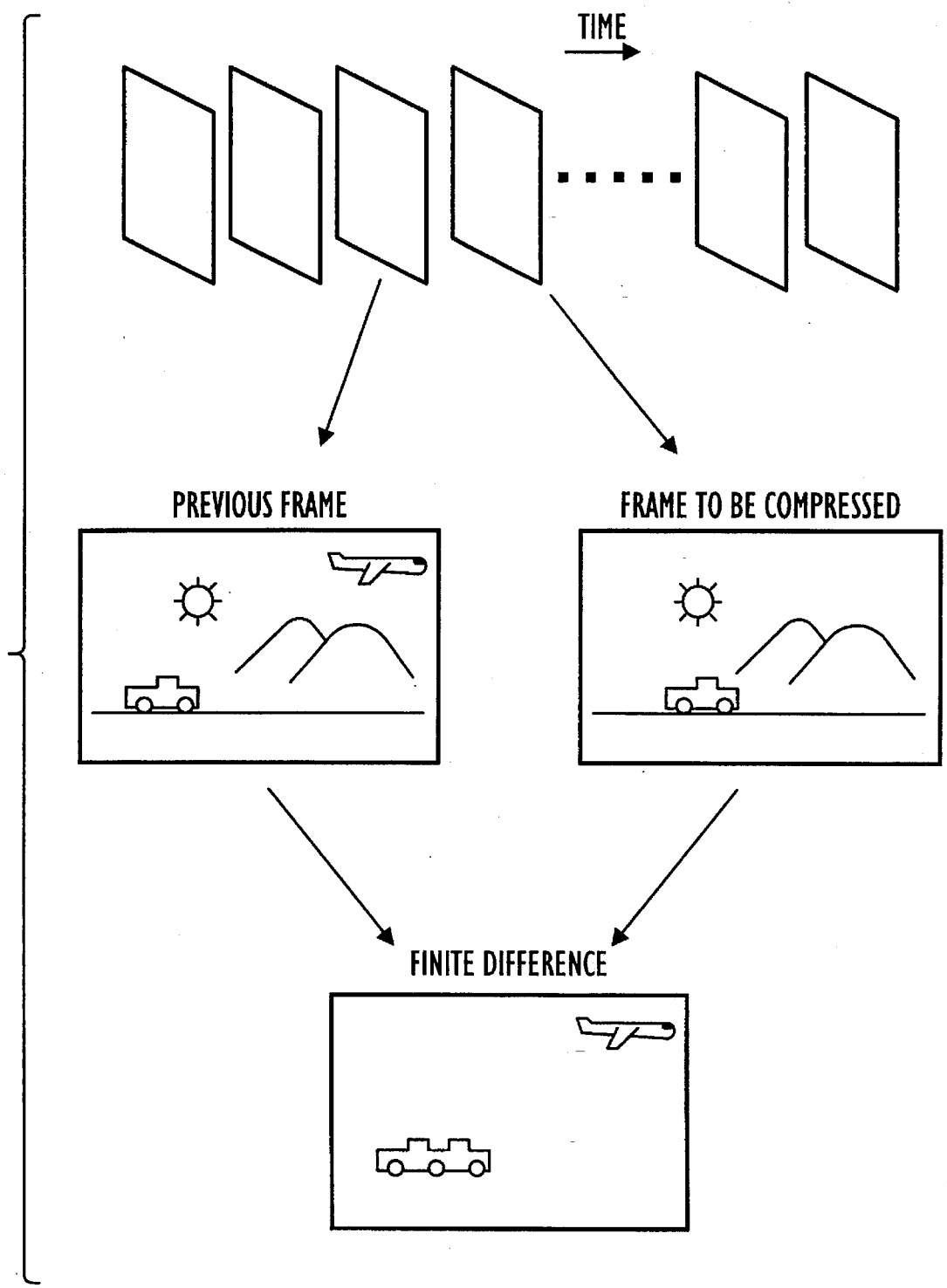
FIG. 7 is an explanatory drawing showing an extraction of a finite difference of an image data between a present frame and a previous frame.
Figure 8A:
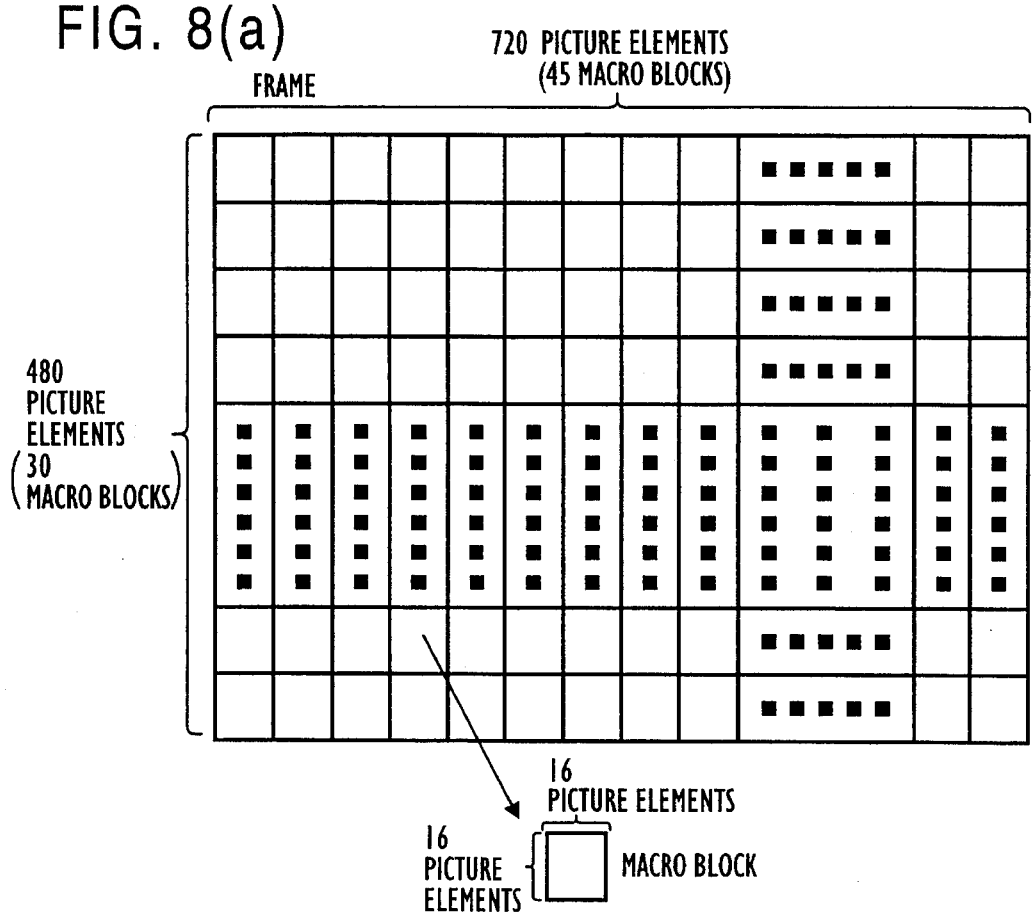
FIG. 8(a) is an explanatory drawing of a macro block.
Figure 8B:
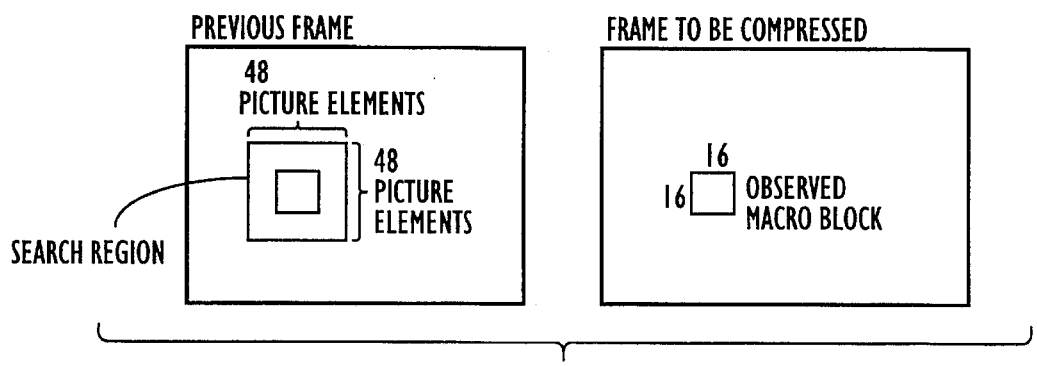
FIG. 8(b) is an explanatory drawing of a search region.
Figure 8C:
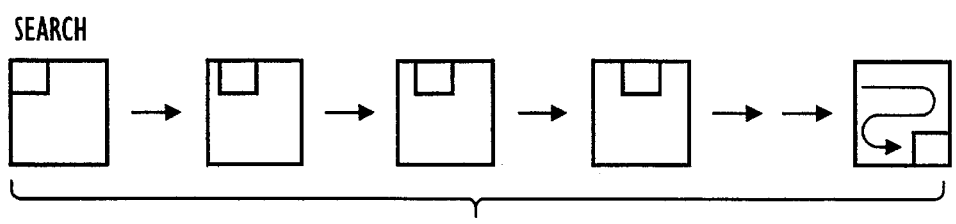
FIG. 8(c) is an explanatory drawing illustrating a sequential change in position of an observed macro block.
Figure 9:
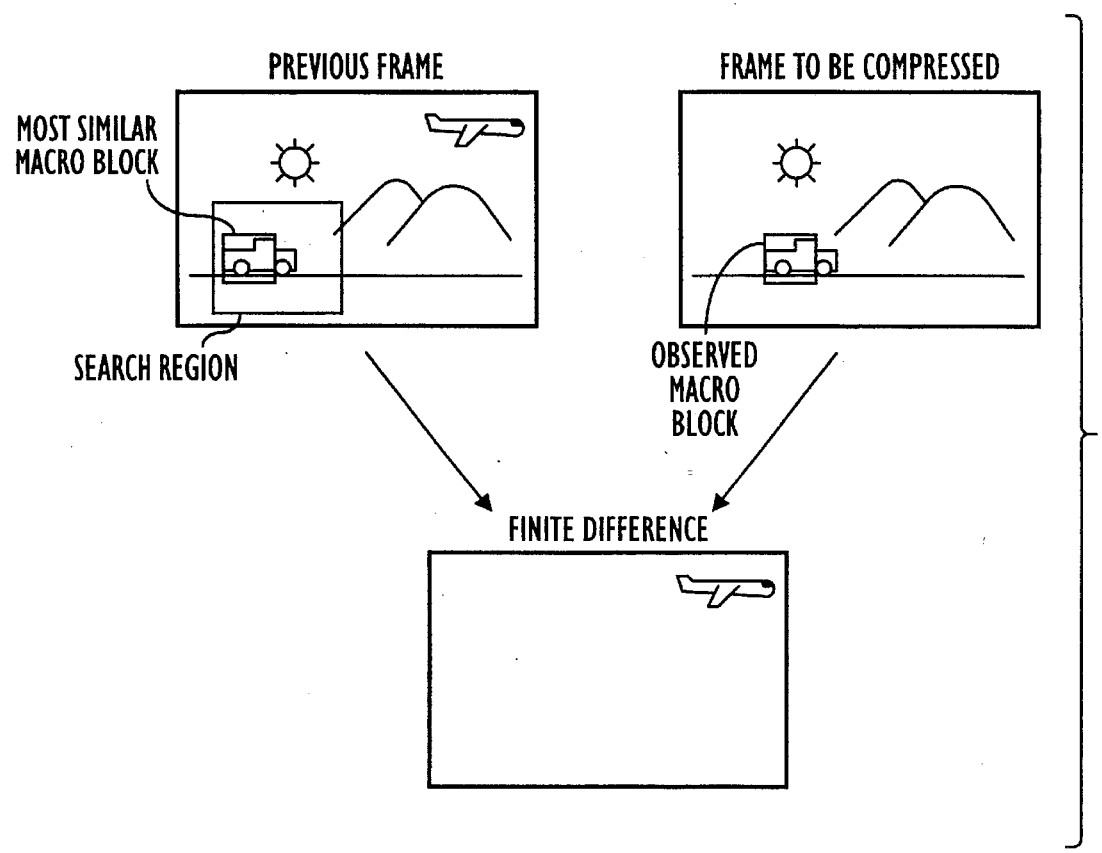
FIG. 9 is an explanatory drawing illustrating that a finite difference data is decreased by a movement detection.
Figure 10:
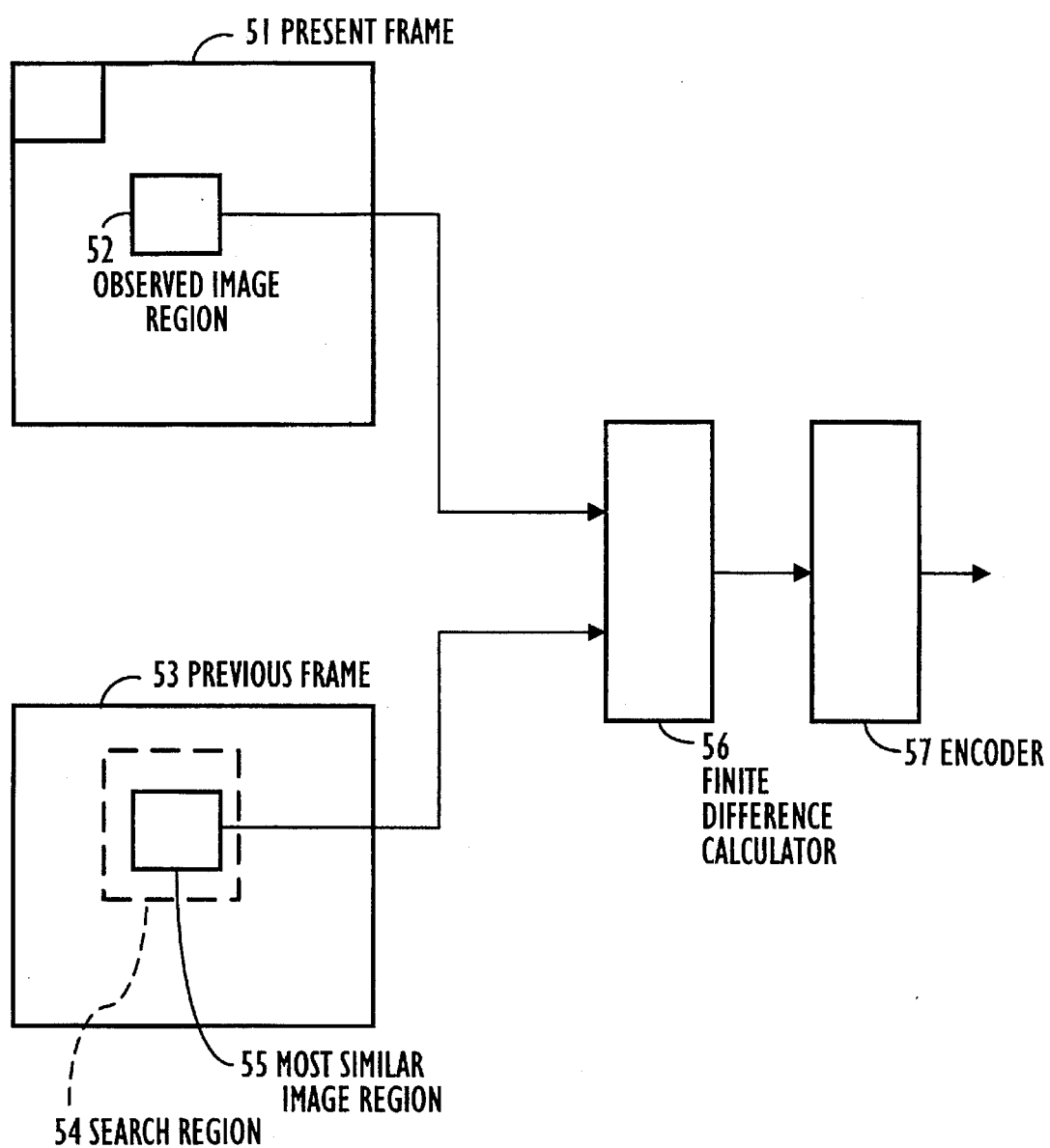
FIG. 10 is a block diagram showing a predictor using the movement detection.

As shown in FIG. 5(a), the multiplexer 15 is composed of pairs of two AND circuits 151a1, 151b1, 151a2, 151b2, ..., 151aN, 151bN to which each bit of 8-bit data from the subtracter 13 and the bit inversion circuit 14 is inputted, NOR circuits 152a, 152b, ..., 152N which receives an output from respective pairs of AND circuits 151a1, 151b1 ..., 151aN, 151bN, and inverters 153a, 153b, ..., 153N for inverting an output of each NOR circuit 152a, 152b, .., 152N.

The operation of the vector correlation detecting circuit with the above construction is described next. First, the subtracter 13 performs the subtraction (X1–Y1) for the first corresponding components X1, Y1 of the two pairs of N-dimensional vector data. The result of subtraction (X1–Y1) is selected when the result of subtraction is positive, and an inverted data ^(X1–Y1) through the bit inversion circuit 14 is selected when the result of subtraction is negative. The selection is carried out by the multiplexer 15, using the most significant bit 17 of the result of subtraction as a control signal. The accumulator 16 whose initial value is 0 accumulates the selected output data 18 and the value of the most significant bit 17 of the result of subtraction.

Subsequently, the same processing is carried out for the data of second components X2, Y2. In detail, the subtracter 13 performs the subtraction (X2–Y2). (X2–Y2) is selected when the result of subtraction is positive, and the inverted data ^(X2–Y2) through the bit inversion circuit 14 is selected when the result of subtraction is negative. The accumulator 16 accumulates the selected output data 18 and the value of the most significant bit 17 of the result of subtraction. The same processing is continued to the N-th components XN, YN to obtain the scale S in the formula (1), sequentially incrementing the subscript.

Accordingly, as well as in the first embodiment, the number of elements and operation time are reduced, compared with the conventional vector correlation detecting circuits 1, 2, 3.

We claim:

1. A vector correlation detecting circuit for calculating a vector correlation value, comprising:

a subtracter, to which two inputs are inputted, for performing a subtraction per corresponding components of two sets of N-dimensional vector data, wherein N is a natural numeral;

an exclusive disjunction circuit for obtaining N data by selecting a result of subtraction by said subtracter when the result of subtraction is positive and by inverting bits of the result of subtraction by said subtracter and selecting an inverted data thereof when the result of subtraction is negative; and an accumulator for obtaining a total sum of a previously-accumulated value, a value of a most significant bit out of N results of subtraction by said subtracter and values of the N data obtained by said exclusive disjunction circuit, thereby calculating the vector correlation value.

2. A vector correlation detecting circuit for calculating a vector correlation value, comprising:

a subtracter, to which two inputs are inputted, for performing a subtraction per corresponding components of two sets of N-dimensional vector data, wherein N is a natural numeral;

a bit inversion circuit for inverting a bit of each result of subtraction which is obtained by said subtracter;

selection means for obtaining N data by selecting a result of subtraction by said subtracter when the result of subtraction is positive and selecting a bit inverted data of the result of subtraction which is obtained by said bit inversion circuit when the result of subtraction is negative;

an accumulator for obtaining a total sum of a previously-accumulated value, a value of a most significant bit out of N results of subtraction by said subtracter and values of the N data obtained by said selection means, thereby calculating the vector correlation value.

\* \* \* \* \*